Patented Oct. 25, 1932

1,884,546

UNITED STATES PATENT OFFICE

PAUL F. BOVARD AND THEODORE D. BECKWITH, OF BERKELEY, CALIFORNIA

PAPER MAKING TECHNIQUE

No Drawing.    Application filed November 14, 1931.   Serial No. 575,148.

This invention relates to an improved process in the production of paper stock in the operation of pulp and paper mills, and has for its objects the control and prevention of slime formation and the production of a superior, more stable stock, as well as the furtherance of mill economy. Investigations of the slime problem have demonstrated conclusively certain bacterial actions accompanied by bacterial growth. Slimes persist within the various operating units of paper or pulp mills and are distributed throughout mill equipment to which paper stock has access. It, therefore, contaminates and becomes a constituent of the pulp mass passing through the system.

In the process of paper and pulp manufacture, "white water", a by-product containing considerable short fiber, becomes infected with slime-producing organisms and the re-circulation and re-use of such white water infected with slime-producing organisms further inoculates the main body of stock by reason of contact. We have found that the slime reveals a mass of encapsulated bacteria together with certain fungous mycelium.

The source of the slime forming organisms has been traced both to the raw water with which the manufacture of the paper is carried out, as well as to the raw material used to form the paper stock, and it has been proposed by others (U. S. Patents Nos. 1,733,070 and 1,733,071) to overcome the cause of slime in paper stock manufacture by treating the raw water, also the diluted stock, at various points throughout the process with chlorine introduced into the liquid.

We have found, however, that the chlorine treatment, unless carried out with quantities of chlorine which would be prohibitive, both on account of its destructive effect on the apparatus, as well as on the cellulose, is not sufficiently effective, as its effect in weak applications is but momentary and it is impossible to maintain a constant discernible residual chlorine content of the diluted stock and white water lasting for long periods of time, unless excessively large quantities be used.

In experimenting for an improved method to overcome slime formation while keeping within the well defined limits of manufacturing costs, we have discovered a treatment which satisfies every requirement.

This treatment comprises the introduction of chloramine $NH_2Cl$, $NHCl_2$, $NCl_3$ to the raw water and/or to the diluted paper stock at various points in the progress of the same through the mill, as well as to the white water flowing from the final operation so that this water or a portion of it may be returned for re-use with the addition of raw water without danger of reinfecting the solutions.

In carrying out our process, the chloramine may be formed of its constituent gases in an aqueous medium and introduced to the raw water in advance of the beater as well as at points in the diluted stock under conditions to insure thorough dissemination of the chloramine throughout the liquid, or the chloramine may be formed within the liquid by first introducing the required ammonia, followed by the chlorine, or vice versa.

The amount of chloramine required may vary somewhat, but the low concentration required and the lack of any deleterious effect on the paper stock allows a wide margin of concentration with equally satisfactory results.

In the presence of wood fiber chloramine concentration of one part per million by weight of the stock will effectually inhibit the growth of any of the slime forming organisms, and sterilization even with heavily infected stock was complete in five minutes, and with various stock concentrations of from 1% to 5%.

Chloramine has been found effective in various amounts so as to leave a residual chloramine content of from .1 to 1 part per million in the stock, and in the white water.

In forming the chloramine directly in the raw water, ammonia, either as a gas or as aqua ammonia, is introduced to the flowing water at a point about 100 feet before the application of the chlorine. At the point of chlorine application, or very shortly thereafter, chloramine is formed when the ratio of ammonia to chlorine is 1 to 2, 1 to 3, and 1 to 4, respectively, depending upon quality of water, temperature, velocity and other factors previously determined. The distribution of the ammonia and chlorine in this chloramine thus produced will vary with the hydrogen ion concentration of the environment. Therefore, the ratio of monochloramine ($NH_2Cl$) to dichloramine ($NHCl_2$) to trichloramine ($NCl_3$) will vary with pH of the solution and suspension thus treated but each one of these compounds is of decided bactericidal and fungicidal effectiveness. We have demonstrated that the effectiveness of the chloramines or germicides in the environment of fiber water mixtures is more rapid and complete when the water solutions containing pulp and fiber suspensions are slightly acid ranging from pH 5.0 to pH 6.8.

With the raw water treatment as herein outlined subsequent or two-stage treatment may in particular cases be eliminated, providing a small residual of chloramine is maintained.

Other advantages over chlorine treatment accruing from the chloramine treatment described are longer life to manufacturing equipment, such as felts, wires and Fourdriniers, as well as a superior paper product which is stable and free from any defects due to slime.

Having thus described our invention, what we claim is:—

1. The improvement in the process of making paper stock which comprises introducing chloramine to the water used in making the paper stock.

2. The improvement in the process of making paper stock which comprises introducing chloramine to the water used in making the paper stock by forming the chloramine directly from its constituents within the water.

3. The improvement in the process of making paper stock which comprises introducing chloramine to the water used in making the paper stock by introducing one of its constituent gases to the water at a point in advance of the other while the water is flowing.

4. The improvement in the process of making paper stock which comprises introducing chloramine to the water used in making the paper stock by adding ammonia and chlorine to the water.

5. The improvement in the process of making paper stock which comprises introducing chloramine to the water used in making the paper stock by adding ammonia and chlorine to the water in proportions respectively as of 1 to 2 up to 1 to 4.

6. The improvement in the process of making paper stock which comprises introducing chloramine to the water used in making the paper stock both before and after incorporating the paper stock therewith.

7. The improvement in the process of making paper stock which comprises introducing chloramine to the water used in making the paper stock both in the raw water as well as to the white water.

8. The improvement in the process of making paper stock which comprises introducing chloramine to the water used in making the paper stock both in the raw water as well as to the white water and returning some of the latter for recycling with the raw water.

9. The improvement in the process of making paper stock which comprises introducing chloramine to the white water of the mill and returning some of the treated white water for recycling through the mill with raw water.

10. The process of claim 2 carried out continuously while the water is flowing.

11. A new product comprising a stable sterile paper stock containing residual chloramine.

12. A new product comprising a stable, sterile paper stock containing residual chloramine of from .1 to 1. part per million of the stock.

PAUL F. BOVARD.
THEODORE D. BECKWITH.

DISCLAIMER 1,884,546.—*Paul F. Bovard* and *Theodore D. Beckwith*, Berkeley, Calif. PAPER MAKING TECHNIQUE. Patent dated October 25, 1932. Disclaimer filed September 1, 1936, by the assignee, *Wallace & Tiernan Company, Inc.*; the licensee, *Great Western Electro-Chemical Company*, acquiescing.

Hereby enters this disclaimer to claims 1 and 9 in said Letters Patent.

[*Official Gazette September 29, 1936.*]